United States Patent [19]

Williams

[11] Patent Number: 5,076,112
[45] Date of Patent: Dec. 31, 1991

[54] EASY SHIFT SECTOR FOR TRANSFER CASE

[75] Inventor: Randolph C. Williams, Weedsport, N.Y.

[73] Assignee: New Venture Gear, Inc., Troy, Mich.

[21] Appl. No.: 687,995

[22] Filed: Apr. 19, 1991

[51] Int. Cl.⁵ .............................................. F16H 5/06
[52] U.S. Cl. .................................... 74/337.5; 74/475
[58] Field of Search ................................ 74/337.5, 475

[56] References Cited

U.S. PATENT DOCUMENTS

| | | | |
|---|---|---|---|
| 2,772,652 | 12/1956 | DuShane et al. | 74/337.5 X |
| 3,700,083 | 10/1972 | Ashikawa et al. | 192/53 F |
| 4,381,828 | 5/1983 | Lunn et al. | 180/247 |
| 4,409,858 | 10/1983 | Lasoen | 74/337.5 |
| 4,704,917 | 11/1987 | Hiroyasu | 74/475 |
| 4,770,280 | 9/1988 | Frost | 192/53 F |

*Primary Examiner*—Dirk Wright
*Attorney, Agent, or Firm*—Harness, Dickey & Pierce

[57] ABSTRACT

A shift apparatus for shifting a transfer case between a two-wheel drive mode and a four-wheel drive mode. The shift apparatus includes a sector plate supported within the transfer case for rotation about an axis. A first pin member is biased into engagement with a first surface of the sector plate. The first pin member is adapted to move a first shift fork in response to selective rotation of the sector plate between first and second positions corresponding to the two-wheel drive mode and the four-wheel drive mode of the transfer case. The sector plate first surface has a first cam edge provided for positioning the first shift fork in the first position, a second cam edge for moving the first shift fork between the first position and the second position in response to rotation of the sector plate, and a third cam edge for retaining the said first shift fork in the second position upon continued rotation of the sector plate. According to the present invention, the second cam edge includes a plurality of sequentially ramped surfaces which are each adapted to cause a variable range of axial forces to be exerted on the first pin member during movement thereof between the first and second positions.

23 Claims, 9 Drawing Sheets

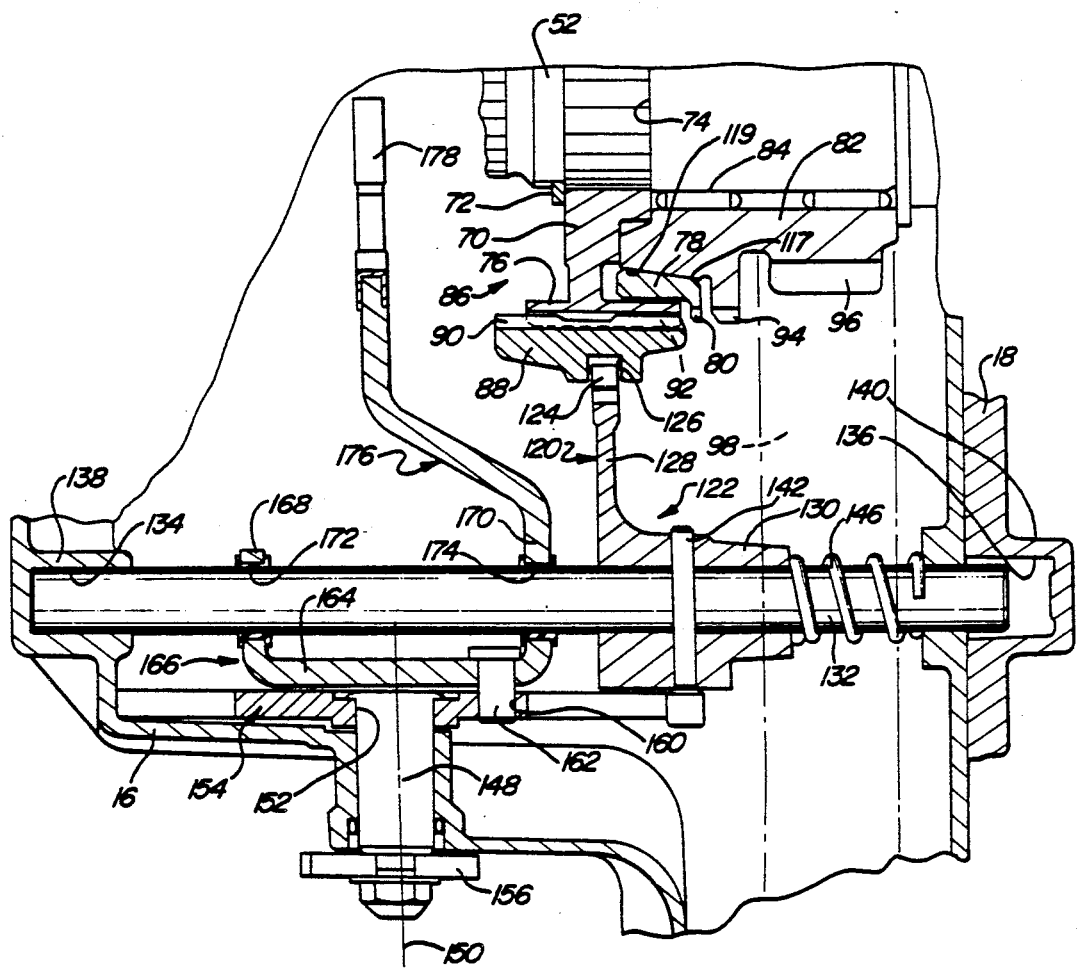
_Fig-4_

EASY SHIFT SECTOR FOR TRANSFER CASE

BACKGROUND OF THE INVENTION

The present invention relates to a shift arrangement for motor vehicle transmissions and, more particularly, to an improved sector plate incorporated into a transfer case shift mechanism. The sector plate has a modified cam profile adapted to reduce operator shift effort when shifting from a two-wheel drive operating mode to a four-wheel drive operating mode during cold weather conditions.

In general, power transfer mechanisms, such as transfer cases, are operatively associated with both manual and automatic transmissions for selectively directing power to the non-driven wheels of a motor vehicle upon shifting from the two-wheel drive mode to the four-wheel drive mode. More particularly, most conventional transfer cases use a transmission type synchronizer clutch arrangement incorporated with a shift fork mechanism to provide "shift-on-the-fly" two-wheel drive to four-wheel drive mode shifting. When shifting the transfer case between the two-wheel and four-wheel drive operating modes, selective movement of a shift lever by the vehicle operator causes corresponding rotation of a sector plate. A mode pin, secured to the shift fork mechanism slidably mounted on a shift rail, is biased into engagement with a cam edge surface of the sector plate so as to be axially displaced upon rotation of the sector plate. As such, the shift fork mechanism slides on the shift rail for travel between positions defining the two and four-wheel operating modes. Moreover, movement of the shift fork mechanism toward the four-wheel drive position acts to energize the synchronizer clutch apparatus for shifting a clutch sleeve into engagement with the external spline of a silent chain carrier. In this manner, the transfer case is "locked-up" in the four-wheel drive operating mode for delivering power to the vehicle's front and rear axle output shafts.

A common problem associated with many conventional part-time transfer cases is that during cold weather conditions it is often extremely difficult to shift into the four-wheel drive mode. In manually actuated part-time transfer cases, the vehicle operator is required to exert an abnormally large input force on the shift lever to physically overcome the excessive shift resistance associated with "cold" shifting into the four-wheel drive operating mode. This increased shift effort is due primarily to the increased viscosity of the lubricant entrained within the front axle final drive assembly which causes viscous drag loading on the transfer case front output shaft. Under such conditions, the synchronizer clutch apparatus cannot generate sufficient frictional torque loading to effectively complete the speed synchronization process between the front and rear output shafts.

However, this cold weather phenomenon is largely temperature dependent in that the increased shift effort is generally experienced only upon attempting to shift into the four-wheel drive mode immediately after cold starting of the vehicle. Once the vehicle has been in four-wheel drive operation for a short period of time or two-wheel drive operation for a longer period of time, the temperature of the lubricant increases while its viscosity decreases so as to restore relatively normal shifting operation of the synchronizer clutch unit. As will be appreciated, it is undesirable to require the vehicle operator to physically overcome the high shift resistance when manually shifting into the four-wheel drive operating mode. Moreover, under extreme cold temperature conditions it may not only be difficult, but virtually impossible for the vehicle operator to shift the transfer case into the four-wheel drive mode until the fluid temperature has increased above a minimum threshold value.

SUMMARY OF THE INVENTION

It is therefore an object of the present invention to overcome the disadvantages associated with conventional transfer cases by providing an improved shift apparatus which is adapted to generate increased synchronizer torque for a given input force. The improved transfer case shift apparatus significantly reduces the shift resistance encountered upon shifting into the four-wheel drive operating mode during cold weather conditions.

Accordingly, the present invention is directed to an improved sector plate having a modified cam profile which is adapted to "track" the various phases of the synchronization process. The modified cam profile includes a plurality of sequentially ramped surfaces which cause axial movement of the mode pin and, in turn, the shift fork mechanism between the two-wheel and four-wheel drive mode positions. Preferably, the sequentially ramped surfaces of the improved sector plate are adapted to generate maximized axial forces at the mode pin for producing increased synchronizer torque while minimizing the axial forces generated during other phases of the synchronization process. In this manner, the vehicle operator is able to exert a relatively constant input force on the shift lever for smoothly advancing the synchronizer shift sleeve into complete lock-up with the chain carrier without experiencing any undesirable shift resistance or clashing.

It is another object of the present invention to provide a transfer case shift apparatus incorporating the improved sector plate which can be simply installed into virtually all part-time transfer cases for optimizing shift effort without requiring any significant design changes.

BRIEF DESCRIPTION OF THE DRAWINGS

Further objects, features and advantages of the present invention will be apparent from the following description and accompanying drawings in which:

FIG. 4 is a fragmentary elevational view of the transfer case shift fork mechanism in its two-wheel drive mode;

FIG. 9 is an elevational view, similar to FIG. 7, showing the shift fork mechanism still further advanced wherein the blocker ring is rotated aside for permitting the clutch sleeve to pass through;

DESCRIPTION OF THE PREFERRED EMBODIMENT

Figure 1:
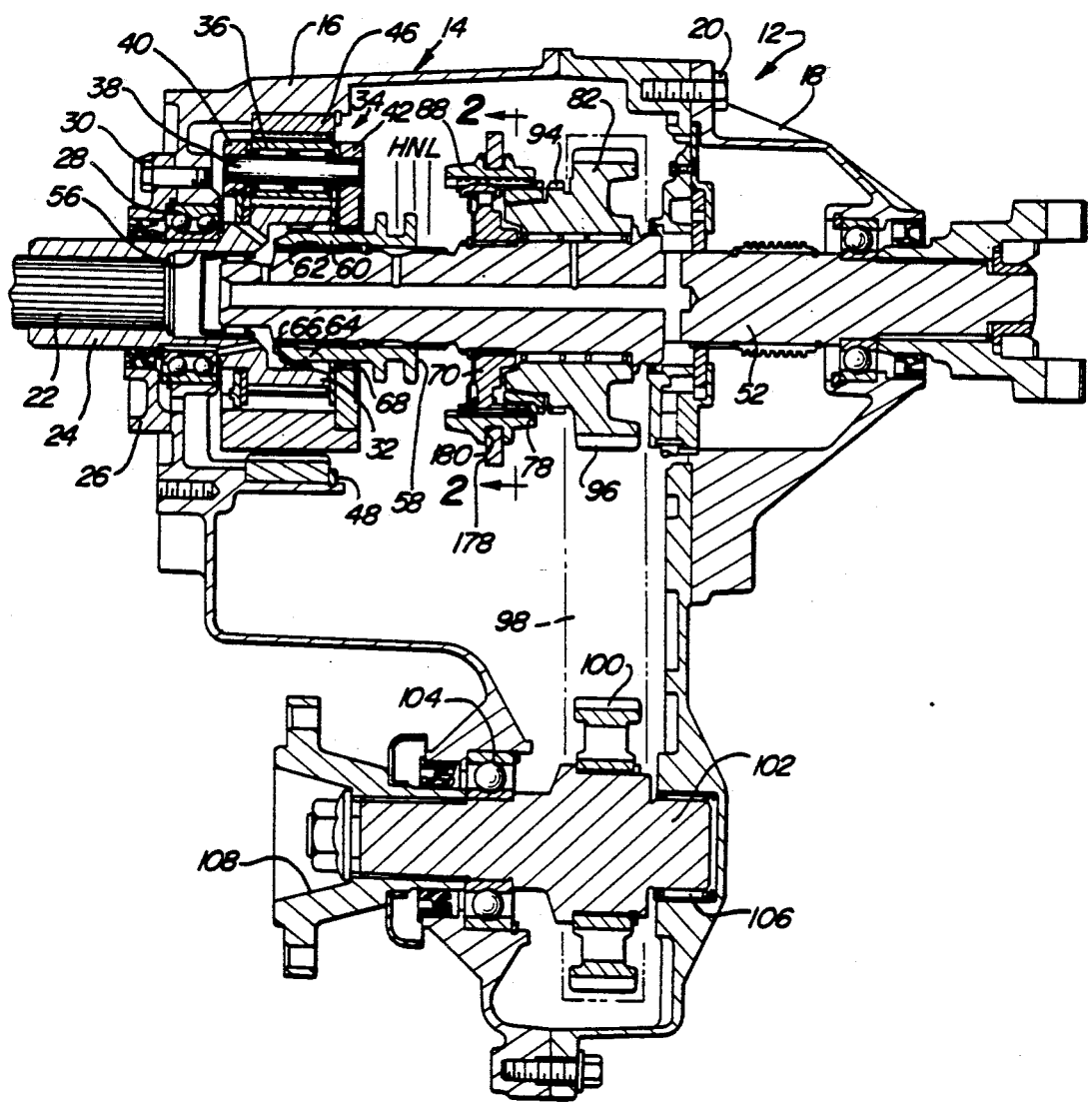
FIG. 1 is a vertical sectional view of an exemplary transfer case for use with the present invention.

Referring now to the drawings, there is shown in FIG. 1 an exemplary transfer case 12 which includes a housing assembly 14 formed by front and back housing sections 16 and 18, respectively, suitably interconnected by a plurality of threaded bolts 20. Front housing section 16 receives a transmission output shaft 22 within an internally splined tubular input stub shaft 24. Input stub shaft 24, driven by an engine (not shown) of a motor vehicle, is shown rotatably mounted in a collar portion 26 of front housing section 16 by a bearing assembly 28 with collar portion 26 secured by bolts 30 to front housing section 16.

Input shaft 24 is provided for transferring power to a planetary gear assembly or the like having a "high-range" direct drive position, a "low-range" position providing reduction ratio drive, and a "neutral" position for disengaging the torque transfer. One exemplary planetary gear assembly 34 is shown to include an input sun gear 32 integrally formed on input stub shaft 24. Sun gear 32 is shown meshed with a plurality of planet gears 36. Each planet gear 36 is rotatably journalled on a pin 38 supported in a planetary carrier. The planetary carrier includes fore and aft ring members 40 and 42, respectively, secured by bolts (not shown). Planet gears 36 mesh with a helical annulus gear 46 mounted via a splined press-fit to an inner surface of front housing section 16. Annulus gear 46 is additionally retained against rearward axial movement away from its stop shoulder by a plurality of radially disposed locking tabs 48 each suitably fixed to front housing section 16.

With continued reference to FIG. 1, transfer case 12 includes a first output in the form of a rear axle output or central shaft 52 which is aligned on the longitudinal axis of input shaft 24 and has a forward end journalled in an input shaft axial bore 56. The rearward end of central shaft 52 is adapted for connecting a rear prop shaft (not shown) for driving the rear axle of a motor vehicle. Central shaft 52 has a range collar 58 axially slidable thereon by means of collar internal splines 60 engaged with external splines 62 on central shaft 52. Range collar 58 is formed with external spline teeth 64 shown slidably engaged with internal sun gear spline teeth 66 located in an axial counterbore in the right or aft end of input shaft 24. Torque or power flow is transferred directly from input shaft 24 to central shaft 52 through engagement of spline teeth 64 and 66 and the engagement of range collar internal splines 60 and central shaft external splines 62 for establishing the direct "high-range" position indicated by the construction line "H".

Carrier aft ring 42 includes internal spur gear teeth 68 formed concentric with range collar 58 which are placed in sliding meshed engagement with collar external spline teeth 64 upon range collar 58 being slid aft for defining the "low-range" position indicated by the construction line "L". In addition, when range collar 58 is moved rearwardly a predetermined distance from its high-range position, its external teeth 64 are disengaged from internal sun gear spline teeth 66 for providing the "neutral" drive range position indicated by construction line "N". Thus, in the neutral position no driving torque is transmitted to central shaft 52, whereby no power is supplied to the vehicle's rear wheels. However, it is to be understood that planetary gear assembly 34 is merely exemplary of the numerous speed reduction mechanisms suitable for use with the present invention.

As best seen in FIGS. 1 through 4, a hub member 70 is fixedly splined to central shaft 52 by a snap ring 72 and a stop shoulder 74 formed thereon. Hub member 70 has an outer cylindrical portion 76 which generally encircles a blocker ring 78 having radially extending external teeth 80 formed at its aft end. In addition, a chain carrier 82 is rotatably journalled by roller bearings 84 on central shaft 52 and can be selectively coupled for rotation to hub member 70 and, in turn, central shaft 52 by a synchronizer apparatus, generally indicated at 86.

Synchronizer apparatus 86 depicted in the present embodiment is a conventional strut-type single-cone synchronizer clutch similar to that shown and described in the U.S. Pat. No. 4,770,280, issued Sept. 13, 1988 to Frost, the disclosure of which is expressly incorporated by reference herein. It is to be understood, however, that virtually any other type of transmission synchronizer apparatus could be used without departing from the scope of the present invention. For example, another synchronizer apparatus which could be used with the present invention is disclosed in U.S. Pat. No. 3,700,083 issued Oct. 29, 1972 to N. Ashikawa et al. and which is commonly referred to as "strutless" type synchronizer. Further, chain carrier 82 could be in the form of other gear means, such as a speed gear member journally mounted in a transmission speed shaft for example, without departing from the scope of the present invention.

With continued reference to FIGS. 1 through 4, an axially shiftable clutch sleeve 88 of synchronizer apparatus 86 is shown in a central disengaged two-wheel mode position. Clutch sleeve 88 is formed with internal spline teeth 90 which are in constant axial sliding engagement with external spline teeth 92 formed on cylindrical hub portion 76. Thus, clutch sleeve 88 may be axially shifted between the two-wheel drive mode position (FIG. 4) toward the four-wheel drive mode position (FIG. 11) to complete lock-up wherein internal spline teeth 90 drivingly engage external spline teeth 94 of chain carrier 82. As best seen in FIG. 1, chain carrier 82 includes a drive sprocket 96 drivingly engaging a chain, shown in dashed lines at 98, which is coupled to a lower driven sprocket 100. Driven sprocket 100 is, in turn, coupled to a second output which is shown as a forwardly extending front axle output shaft 102. Front output shaft 102 is mounted for rotation within front housing section 16 by a ball bearing assembly 104 and in rear housing section 18 by a roller bearing assembly 106. Front output shaft 102 is suitably connected by a coupling 108 to the motor vehicle's front propeller drive shaft (not shown) for driving the front wheels. Reference may be had to U.S. Pat. No. 4,381,828 issued May 3, 1983, to Lunn et al. for details of a typical transfer case mounting showing its connection to a motor vehicle's front and rear drive axles. The disclosure of the Lunn et al. patent is expressly incorporated by reference herein.

Figure 2:
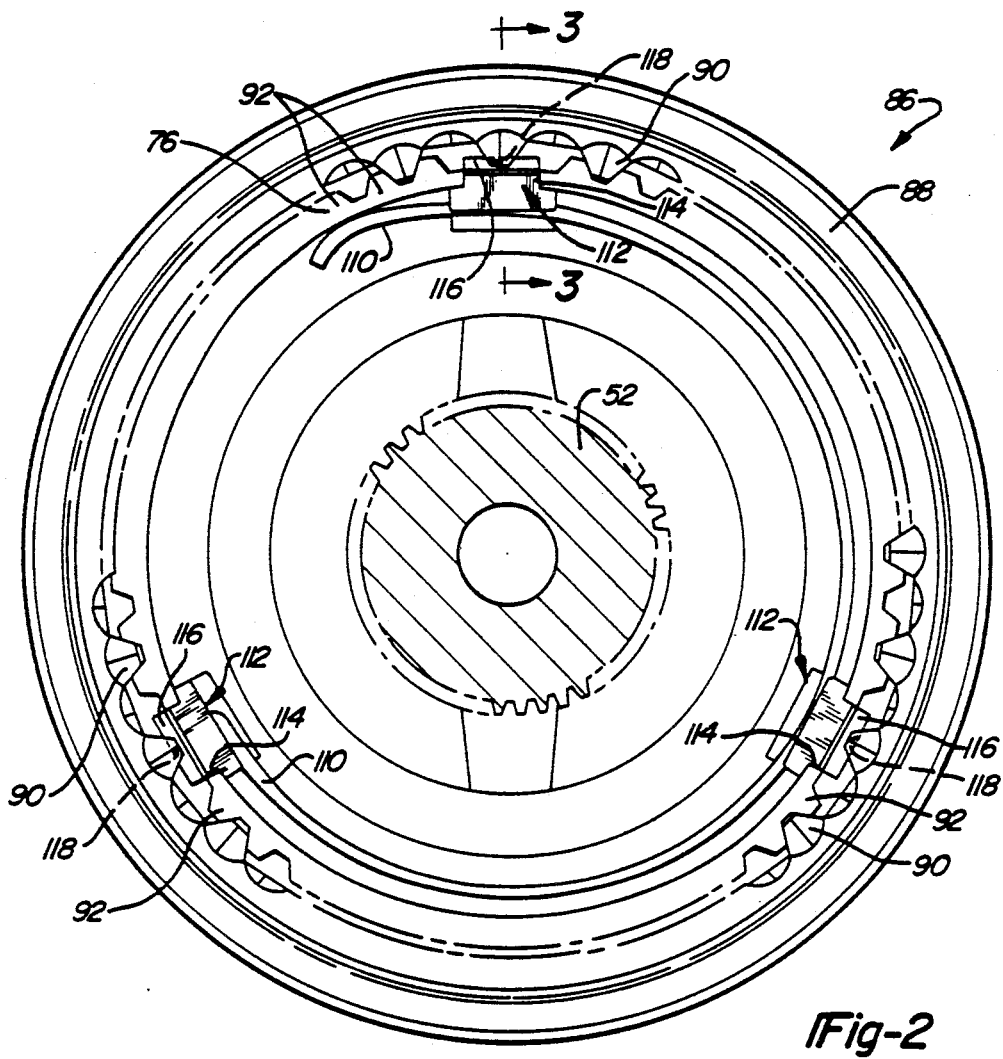
FIG. 2 is a cross-sectional view taken along line 2—2 of FIG. 1 showing an exemplary synchronizer clutch apparatus.
Figure 3:
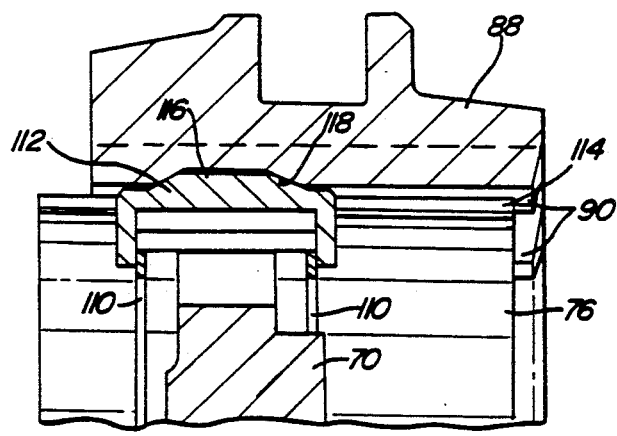
FIG. 3 is a fragmentary sectional view taken along line 3—3 of FIG. 2.

As best seen in FIGS. 2 and 3, synchronizer apparatus 86 includes a thrust mechanism which is provided for moving blocker ring 78 toward chain carrier 82 upon rearward shifting movement of clutch sleeve 88. Moreover, in strut-type blocking synchronizer 86 the thrust mechanism comprises a pair of energizing circular retainer springs 110 that are compressed and inserted between a plurality of circumferentially spaced key-like struts, generally indicated at 112. Each of the three struts 112 are biased outwardly in their respective longitudinally extending slots 114 formed in cylindrical hub portion 76. Struts 112 each have a raised central "bump" portion 116 which engage a corresponding detent groove or recess 118 formed in sleeve external spline teeth 92 with clutch sleeve 88 in its neutral FIG. 4 position. As will be described, rearward movement of synchronizer blocker ring 78 results in frictional loading between a blocker ring inner conical surface 117 and a mating chain carrier outer conical surface 119 by outward thrusting of struts 112.

With reference now to FIG. 4, it will be seen that a mode fork 120 of a shift fork assembly 122 has forked projections 124 engaged in an annular groove 126 formed in clutch sleeve 88. Mode fork 120 includes an arm 128 formed integral with a longitudinally extending cylindrical tube member 130. A shift rail 132 is received within tube member 130 and its opposite ends are suitably supported in fore and aft sockets 134 and 136 respectively, formed in housing assembly 14. More particularly, socket 134 is formed in a boss 138 integral with front housing section 16 while socket 136 is formed in a boss 140 integral with aft housing section 18. Tube member 130 is fixed for limited axial movement with shift rail by a mode pin 142. Moreover, mode fork 120 is normally biased toward the two-wheel drive mode position (FIG. 4) by spring member 146.

A rotatable actuating shaft 148 is supported in the interior of transfer case housing assembly 14 for rotation about its axis 150. A first end of actuating shaft 148 is secured in an aperture 152 formed in a sector plate 154. A shift lever 156 is suitably connected to an opposite end of actuating shaft 148 for rotating actuating shaft 148 and sector plate 154 about axis 150 under the selective control of the vehicle operator. It will be understood that actuating shaft 148 can be rotated either manually or mechanically (such as by an electric drive motor) without departing from the fair scope of the present invention.

Figure 5:
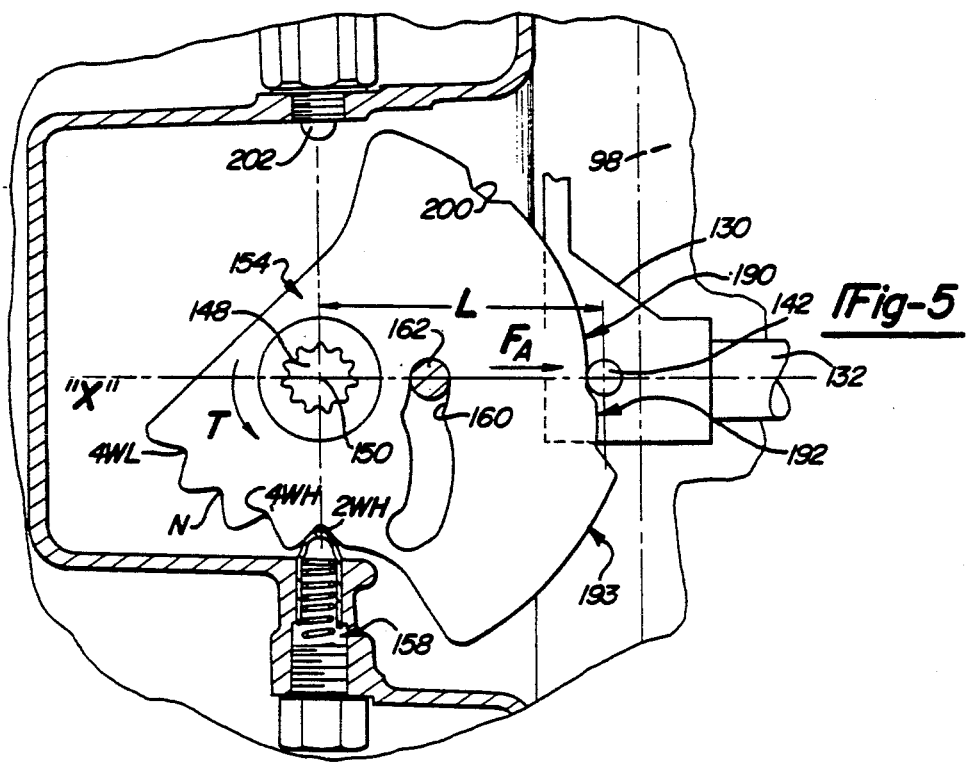
FIG. 5 is a partial side view of FIG. 4 showing a preferred embodiment of the contoured cam profile formed on the improved sector plate in the two-wheel drive position.

From FIG. 5, it can be seen that sector plate 154 may be rotated by actuator shaft 148 to any of four selected operating positions indicated by the four distinct sector notches labeled "2WH", "4WH", "N" and "4WL" each successively engageable by a spring biased plunger assembly 158. In addition, sector plate 154 has an elongated contoured slot 160 formed therein into which a range pin 162 extends. From FIG. 4 it can be seen that range pin 162 is mounted in a base portion 164 of a U-shaped range bracket 166. Range bracket 166 includes a pair of fore and aft flanges 168 and 170, respectively, extending normal to base portion 164 toward central output shaft 52. Forward flange 168 has an aperture 172 therein sized for slidably receiving shift rail 132. Similarly, range bracket aft flange 170 is provided with an aperture 174 also sized for the reception of shift rail 132. Aft flange 170 has formed integral therewith a range fork assembly 176 having forked projections 178 engaged in an annular groove 180 (FIG. 1) of clutch collar 58.

With continued reference to FIG. 5, sector plate 154 is shown to define first, second and third cam edges generally designated as 190, 192 and 193, respectively, which are consecutively engageable with mode pin 142 due to the spring biasing force of spring member 146. First and third cam edges 190 and 193 are both constant radius surfaces (i.e. arcs of a circle) having their respective centers located on axis or point 150. As seen in FIG. 5, the point of contact of mode pin 142 on first cam edge 190 defines the two-wheel drive high-range (2WH) position. As sector plate 154 is caused to rotate about axis 150, second cam edge 192 causes axial displacement of mode pin 142, and thus mode fork 120 along the longitudinal axis "X" of shift rail 132 between positions corresponding to the two-wheel drive high-range (2WH) and four-wheel drive high-range (4WH) operating modes of transfer case 12. Moreover, third cam edge 193 defines an axial "dwell" position which acts to maintain mode pin 142 and, in turn, mode fork 120 positioned in the four-wheel drive mode position while the edge profile of contoured slot 160 causes sliding axial movement of range fork 176 relative to shift rail 132 for shifting range collar 58 between the high-range and low-range positions upon continued rotation of sector plate 154.

Figure 6:
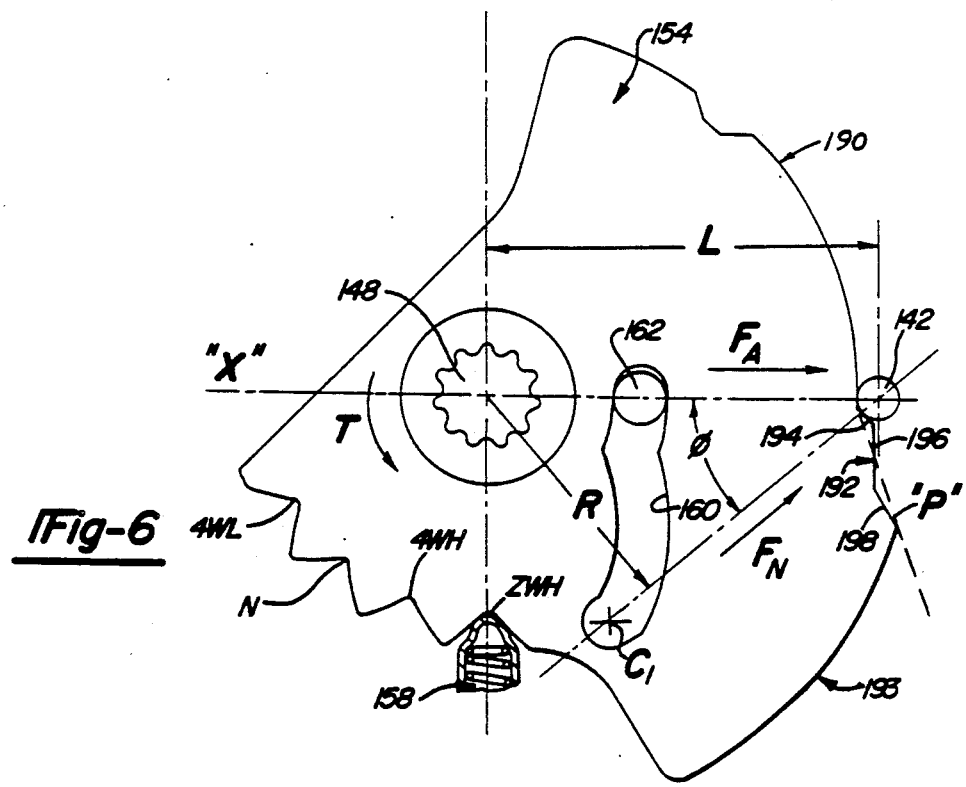
FIG. 6 is a side view, similar to FIG. 5, showing the improved sector plate partially rotated for advancing the mode pin onto a first ramped surface wherein the clutch sleeve is moved axially for closing synchronizer running clearances.

In the particular embodiment described, when the vehicle operator desires to shift transfer case 12 from the two-wheel drive high-range (2WH) to the four-wheel drive high-range (4WH), shift lever 156 is selectively moved for causing corresponding rotation of actuation shaft 148 and sector plate 154 counterclockwise through a predetermined angle for coupling chain carrier 82 to first output shaft 52 via actuation of synchronizer apparatus 86. Therefore, in accordance with the principles of the present invention, second cam edge 192 of sector plate 154 has been modified from the singular linear or arcuate cam edge "P" typically associated with prior art sector plates (shown in phantom in FIG. 6) to include multiple sequentially ramped surfaces. According to a preferred embodiment, second cam edge 192 of sector plate 154 is shown to include first, second and third arcuate ramped surfaces 194, 196 and 198, respectively, having their respective centers and arc lengths selected for "tracking" the various phases of the 2WHto-4WH synchronization process in a manner to be described hereafter. In addition, the centers of the plurality of arcuate surfaces are offset from axis 150 for reasons to be described hereafter. In general, the modified sequential profile of second cam edge 192 is designed to exert maximum axial forces on mode pin 142 upon rotation of sector plate 154 when most needed while minimizing the axial forces exerted when least required for effectively reducing two-wheel drive to four-wheel drive mode shift effort.

As is known, the synchronization torque or "cone" torque generated upon energization of virtually any cone-type synchronizer apparatus can be generally determined from the equation:

$$T_c = F_A \mu_c R_c \quad (1)$$

where;

$T_c$ = cone torque, (lb-in), $F_A$ = the axial force exerted on blocker ring 78 (lb), $\mu_c$ = the dynamic coefficient of friction between inner conical surface 117 of blocker ring 78 and outer conical surface 119 of chain carrier 82, and $R_c$ = the mean cone radius of conical surface 119 of chain carrier 82 (in.).

However, in cone-type synchronizer 86 the normal force component of $F_A$ is $F_A/\text{SIN}\theta$ wherein $\theta$ represents the cone angle of chain carrier conical surface 119. As such, the cone torque ($T_c$) for cone-type synchronizer 86 becomes;

$$T_C = \frac{F_A \mu_C R_C}{\text{SIN}\theta} \quad (2)$$

Figure 14:
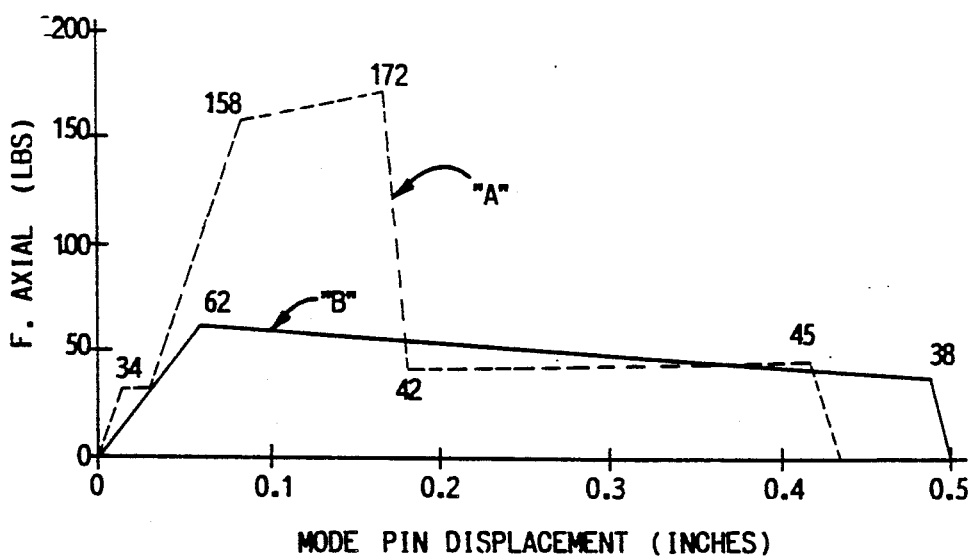
FIG. 14 is an exemplary graphical illustration of the axial force exerted at the mode pin versus axial mode pin displacement of the mode pin for the improved sector plate of the present invention compared to a conventional sector plate.

To achieve a significant shift effort improvement in the synchronized 2WH to 4WH shift during cold weather conditions, the cone torque ($T_c$) generated by synchronizer apparatus 86 must be increased for a given input torque (T) applied to actuator shaft 148 via selective movement of shift lever 156 (or via an electric motor). Accordingly, the present invention is directed to utilization of multi-ramped cam edge 192 capable of selectively varying the axial force ($F_A$) versus mode pin displacement curve (FIG. 14).

For a better appreciation of the advantages associated with multi-ramped cam edge 192, the sequence of steps or phases associated with the 2WH to 4WH speed synchronization process will now be described in greater detail. Initial movement of clutch sleeve 88 from its neutral disengaged two-wheel drive mode position (FIG. 4) to a first strut detent position occurs due to slight counterclockwise rotation of sector plate 154 from the 2WH position of FIG. 5 to the position shown in FIG. 6. More particularly, the axially directed force ($F_A$) acting on mode pin 142 causes corresponding axial movement of mode fork 120 and, in turn, clutch sleeve 88 due to mode pin 142 engaging first ramp surface 194. As such, clutch sleeve 88 and struts 112 move axially out of the neutral FIG. 4 position for taking up the running clearances between clutch sleeve 88 and blocker ring 78, and between blocker ring 78 and chain carrier external teeth 94. Thereafter, a strut detent load build-up occurs wherein struts 112, blocker ring 78, and chain carrier 82 are loaded by struts 112 riding out of detent groove 118.

The second phase in the synchronization process is the "energization" phase wherein blocker ring 78 moves to an indexed or clocked position. This "indexing" occurs because the axial force ($F_A$) is being applied to blocker ring 78 by struts 112. As such, an initial frictional "cone" torque loading is developed due to frictional loading between blocker ring inner conical surface 117 and chain carrier outer conical surface 119. This initial cone torque loading causes blocker ring 78 to rotate in one direction to its indexed position. Blocker ring 78 has three equally spaced indexing lugs (not shown) centered in their associated hub slots. In the indexed position, blocker ring 78 has each of its outer lugs rotated in one direction into contact with one side of their associated hub slot.

Figure 7:
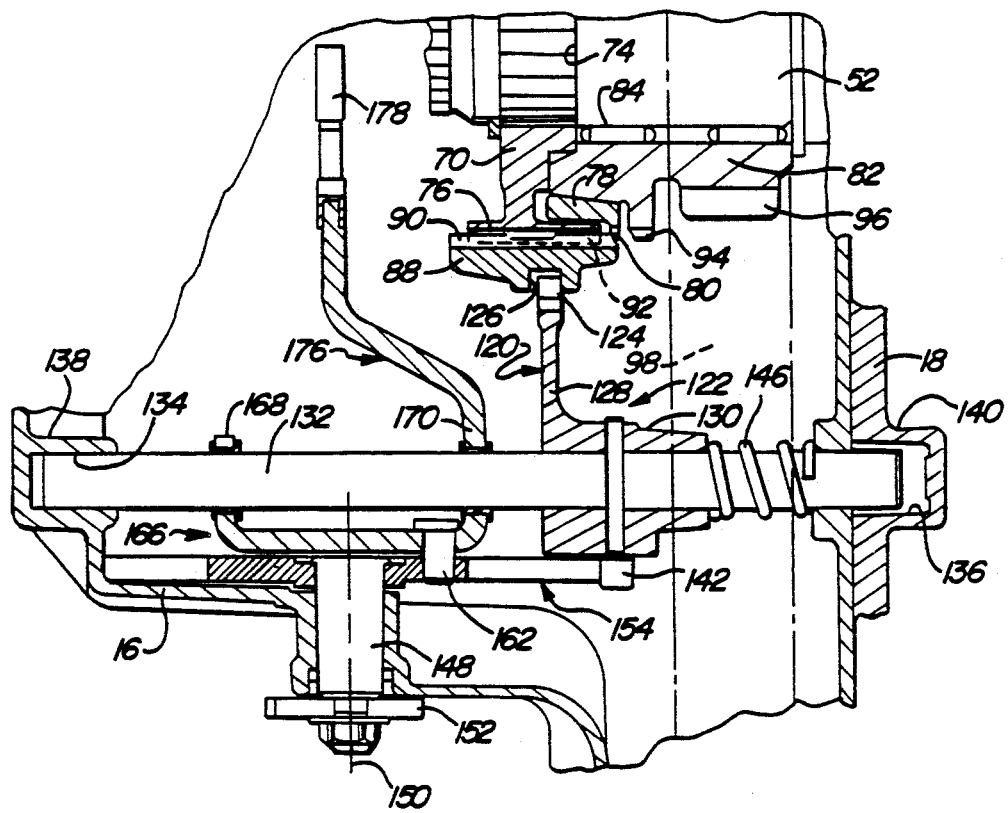
FIG. 7 is an elevational view, similar to FIG. 4, wherein the shift fork mechanism is further advanced such that the clutch sleeve teeth are shown in chamfer-to-chamfer "blocking" engagement with the blocker ring teeth.
Figure 8:
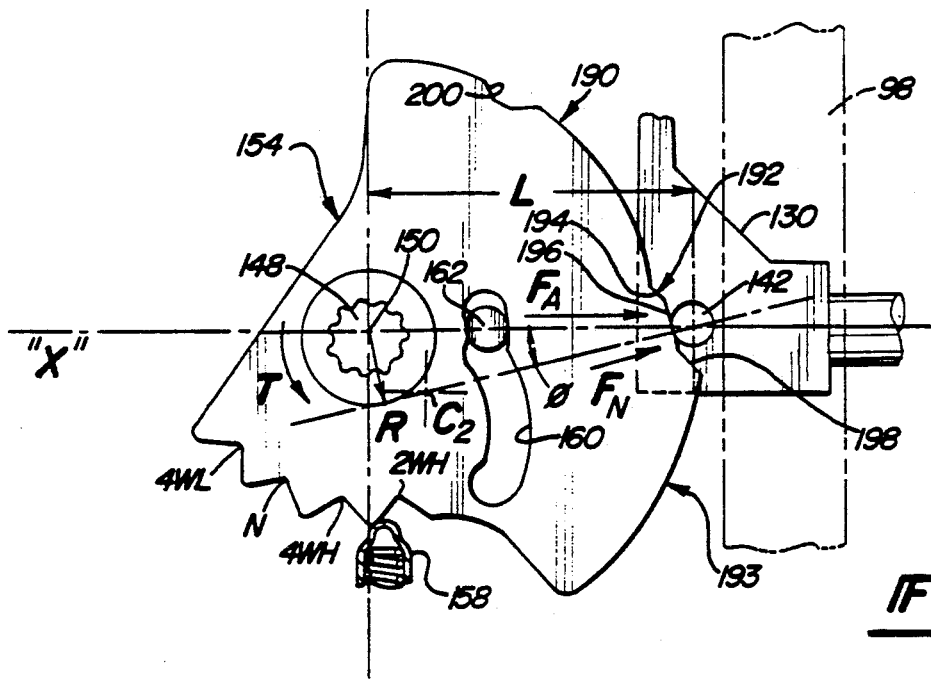
FIG. 8 is a partial side view of FIG. 7 showing the sector plate further rotated for advancing the mode pin onto a second ramped surface.

In the third phase, clutch sleeve 88 moves to a chamfer-to-chamfer loading position (FIG. 7) upon mode pin 142 being axially displaced upon engagement with second ramp surface 196 of second cam edge 192. As such, the chamfers on internal spline teeth 90 contact the chamfers on blocker ring external teeth 84 for "blocking" axial passage of clutch sleeve 88 therethrough until synchronization is complete.

In the fourth phase, blocker ring 78 rotates aside in the opposite direction for allowing clutch sleeve internal spline teeth 90 to pass. This opposite rotation of blocker ring 78 is achieved when the rotational speed of chain carrier 82 causes the cone torque to effectively fall to zero. Synchronization is now complete and blocker ring 78 is no longer energized. Since the index torque resulting from the chamfer-to chamfer loading between sleeve internal splines 90 and blocker ring teeth 84 now exceeds the cone torque, blocker ring 78 is free to rotate in the opposite direction.

Figure 9:
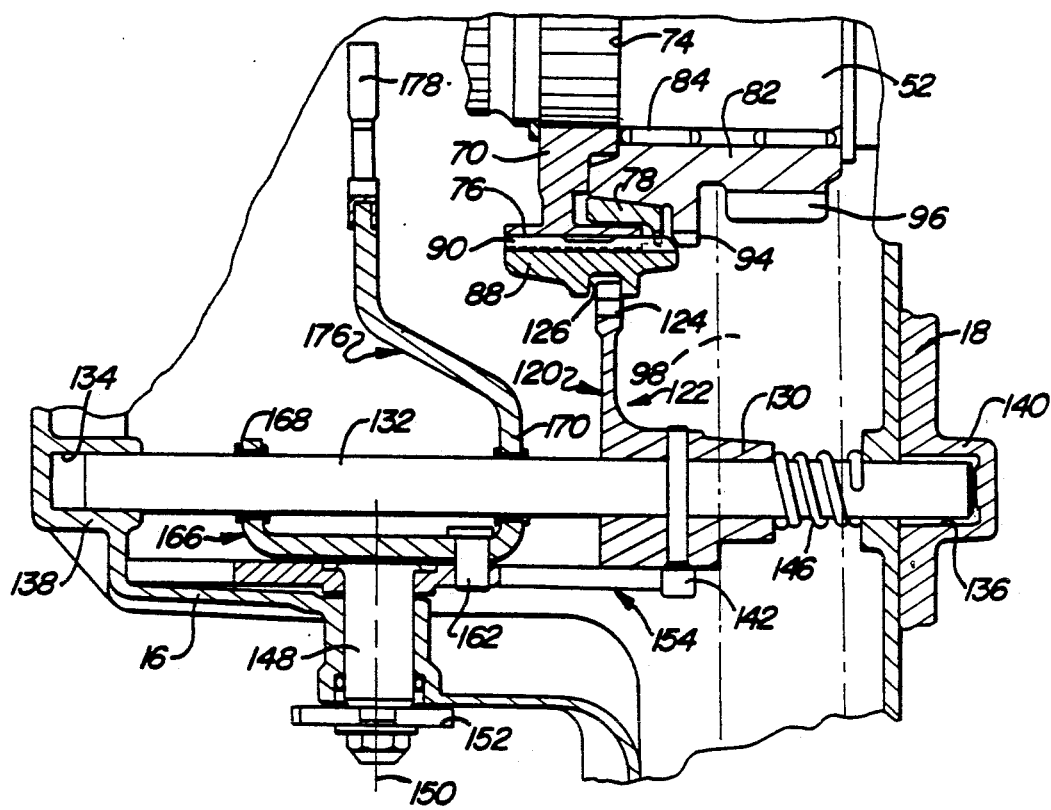
Figure 10:
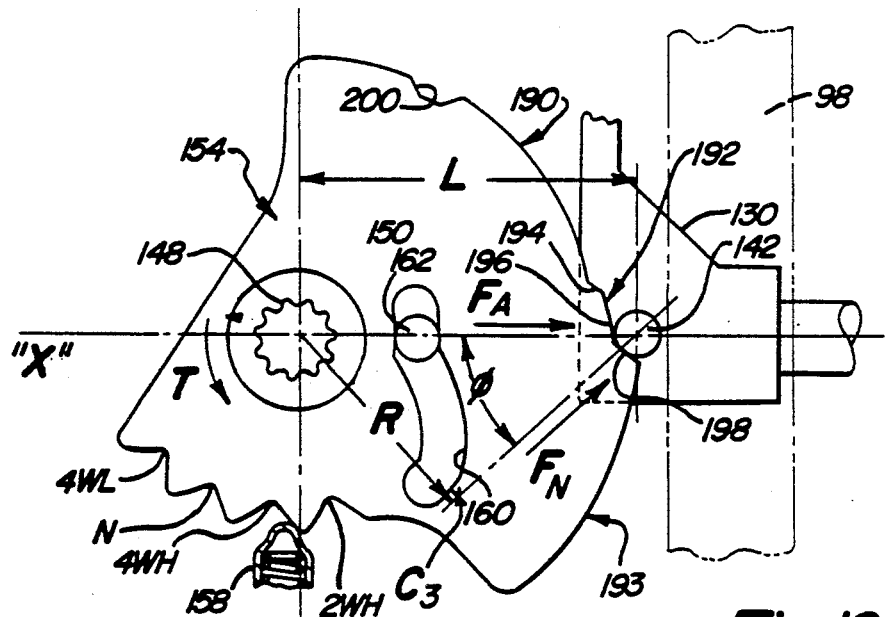
FIG. 10 is a partial side view of FIG. 9 showing the sector plate still further rotated for advancing the mode pin onto a third ramped surface.
Figure 11:
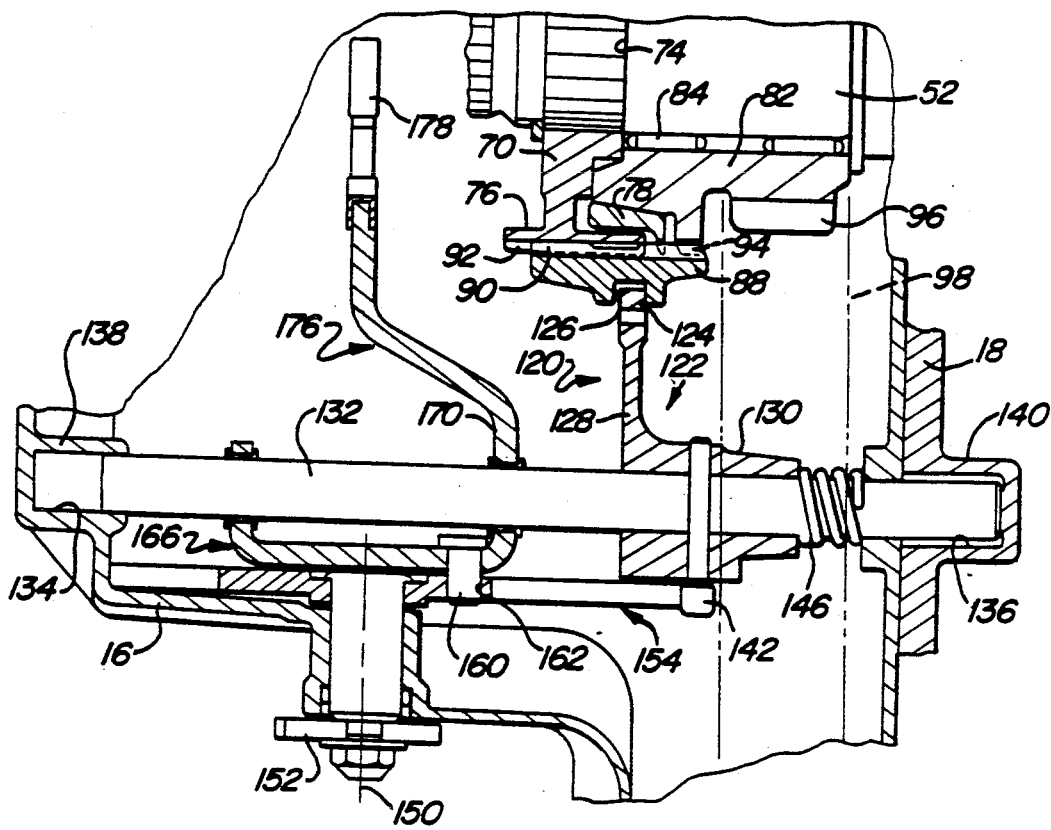
FIG. 11 is an elevational view, similar to FIG. 9, showing the clutch sleeve in its fully "locked-up" position.
Figure 12:
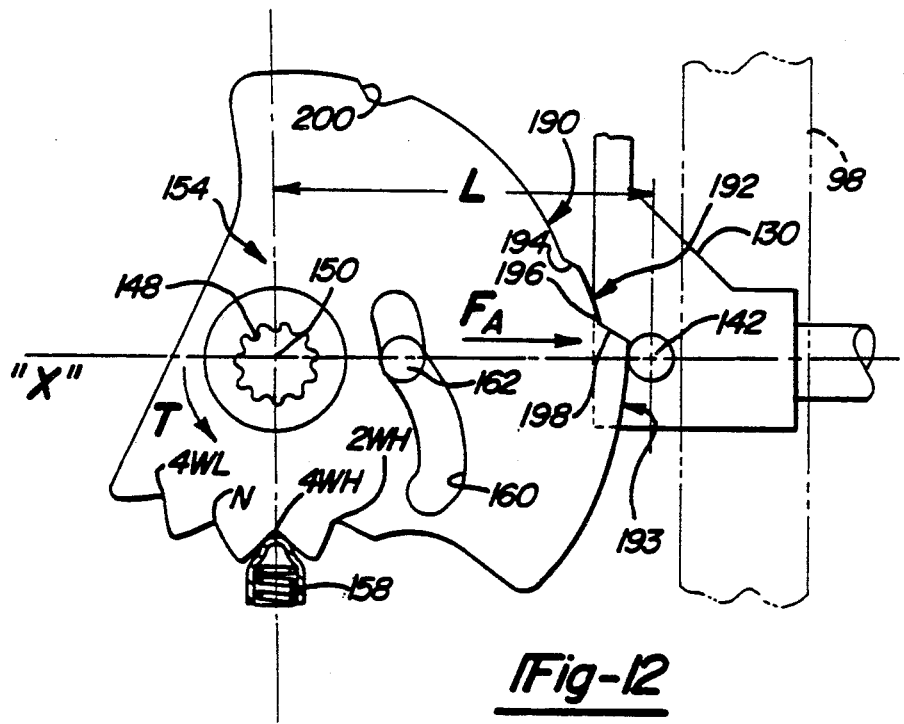
FIG. 12 is a partial side view of FIG. 11 showing the sector plate rotated to the four-wheel drive position.

As best seen in FIGS. 9 and 10, the fifth phase occurs upon completion of speed synchronization wherein clutch sleeve internal splines teeth 90 pass beyond blocker ring teeth 84 a predetermined distance until initial contact is made between clutch sleeve spline teeth 90 and chain carrier external spline teeth 92. This axial movement of clutch sleeve 88 is generated via mode pin 142 engaging third ramp surface 198. In the sixth and final phase, an index torque is built on the chamfers which moves chain carrier 82 aside for permitting clutch sleeve 88 to pass through to complete the "lock-up" in the four-wheel drive mode (FIGS. 11 and 12). In the "lock-up" position the axial displaced position of clutch sleeve 88 is due to mode pin 142 engaging arcuate "dwell" cam edge 193.

With reference now to FIGS. 6, 8, 10 and 12, the axial force ($F_A$) generated at mode pin 142 from a given input torque (T) exerted on shaft 148 for each of the sequentially ramped arcuate surfaces 194, 196 and 198, respectively, can be defined by the following equations:

$$T = F_N R \quad (3)$$

$$T = F_N R \quad (3)$$

$$\text{SIN}\Phi = \frac{R}{L} \quad (4)$$

$$\text{COS}\Phi = \frac{F_A}{F_N} \quad (5)$$

Where;

$F_N$ = the normal force (lbs) exerted on mode pin 142,

R = the normal distance (in.) between axis 150 and a line extending from the offset center of one of the arcuate ramp surfaces through the contact point of mode pin 142, L = axial displacement (in.) of mode pin 142 from axis 150, and $\Phi$ = the acute angle formed between the vectors $F_N$ and $F_A$. From Equation (5) the axial force ($F_A$) becomes;

$$F_A = F_N COS\Phi \qquad (6)$$

Combining Equations (3) and (6):

$$F_A = \frac{T}{R} COS\Phi \qquad (7)$$

Combining Equations (4) and (7):

$$F_A = \frac{T}{LSIN\Phi} COS\Phi \qquad (8)$$

Therefore, $$F_A = \frac{T}{LTAN\Phi} \qquad (9)$$

From Equation No. 9 it can be seen that the available axial force ($F_A$) generated for axially displacing mode pin 142 for a given input torque (T) on shaft 148 will increase as the angle ($\Phi$) decreases. Accordingly, the present invention incorporates this principle by selectively modifying second cam edge 192 into the distinct sequential ramped or contoured surfaces. According to the embodiment shown, first arcuate surface 194, referred to as the "clearance" ramp defines a first center ($C_1$) and arc length selected to provide sufficient force ($F_A$) to take up running clearances in synchronizer apparatus 86 upon initial rotation of sector plate 154 to the FIG. 6 position. Second arcuate surface 196, commonly referred to as the "synchro" ramp, has a second center ($C_2$) with an increased arc length selected for generating an increased axial force ($F_A$) value during the synchronization phase (see FIG. 8) by decreasing the angle $\Phi$. This, in turn, results in an increased cone torque ($T_c$) being generated by synchronizer 86 for a given input torque (T). Finally, second cam edge 192 of sector plate 154 includes third arcuate surface 198 which has a third center ($C_3$) and arc length designed for developing a sufficient axial force ($F_A$) at mode 142 pin for permitting relatively easy pass through and "lock-up" following completion of the synchronization process (see FIG. 10). As will now be appreciated, the specific contour of each of the three arcuate surfaces is selected to produce a distinct axial force ($F_A$) values during selected phases of the synchronization process. In this manner, the axial force ($F_A$) generated at different mode pin axial displacement positions is optimized to significantly reduce shift resistance. However, while the ramped surfaces have been described as being arcuate, it is to be understood that non-arcuate surfaces, such as linear ramps, may also be suitably incorporated into multi-ramped cam edge 192. Furthermore, it will be appreciated that while the embodiment disclosed herein teaches utilization of three ramp surfaces for modified cam edge 192, the principles of the present invention can be used to provide any plurality of ramp surfaces for selectively varying the axial force ($F_A$) at any given mode pin position.

Figure 13:
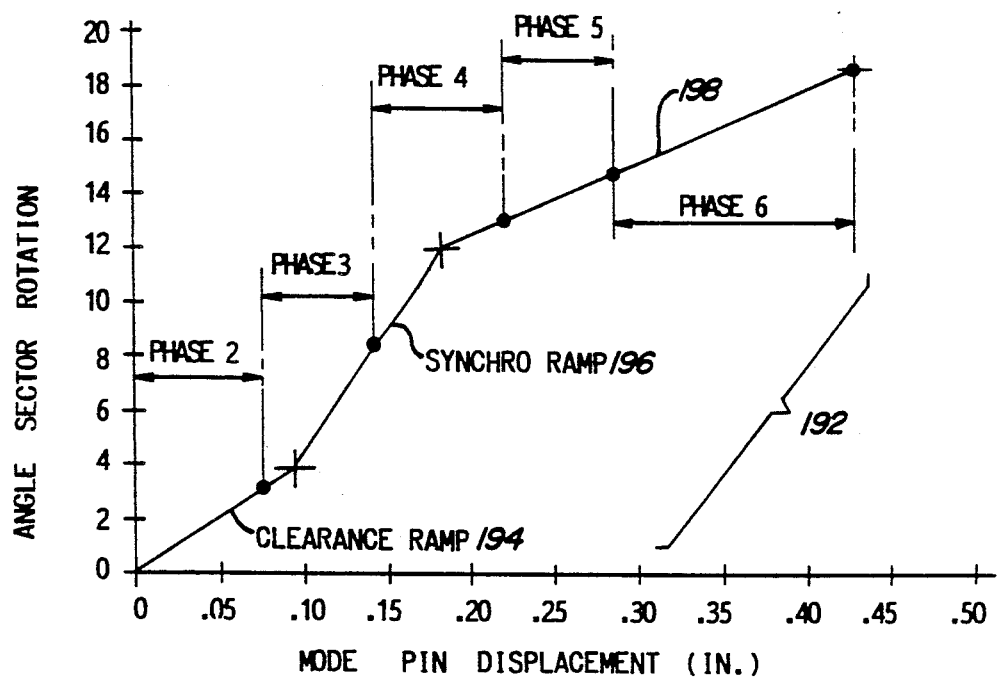
FIG. 13 graphically illustrates the angular rotation of the sector plate versus the axial displacement of the mode pin for the various phases of the speed synchronization process.
Figure 15:
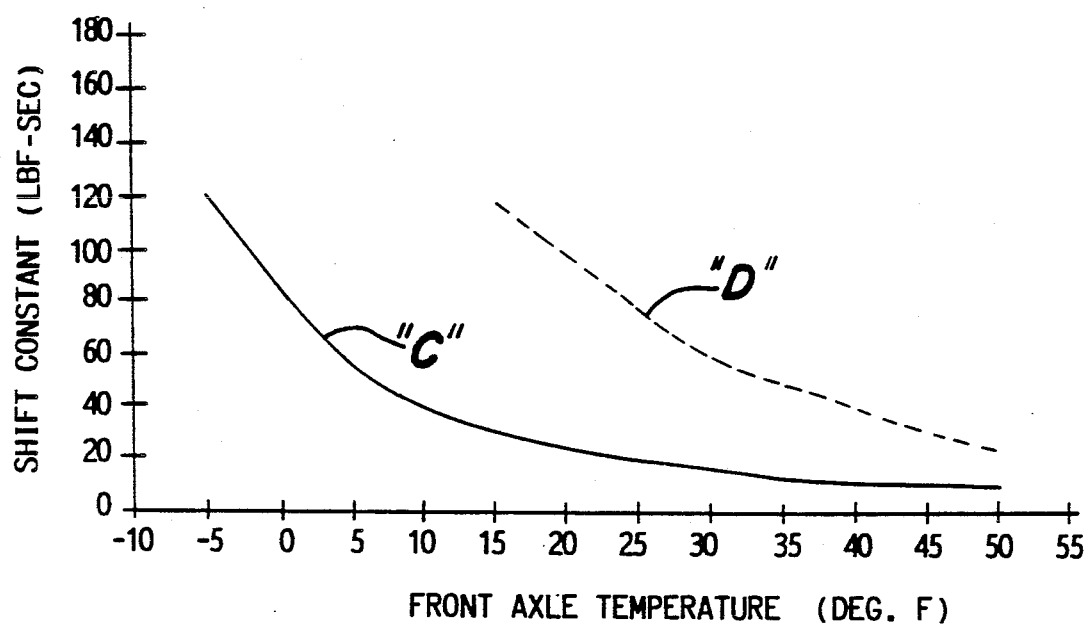
FIG. 15 is an exemplary graphical illustration of shift constant versus front axle fluid temperature showing the improvement in the ability to shift with reduced shift effort force associated with the improved sector of the present invention which also permits shifting to occur at a substantially reduced fluid temperature.

With reference now to FIGS. 13 through 15, the significant improvements associated with improved sector plate 154 of the present invention are exemplified. More particularly, FIG. 13 is a graphical illustration showing the approximate initiation and termination points for the various phases of the synchronization process herebefore described relative to the angular rotated position of sector plate 154 and the axial displacement of mode pin 142 for an exemplary sector plate having a 20° 2WH-to-4WH shift. Moreover, it will be appreciated that the novel principles of the present invention can be employed to selectively modify the 2WH to 4WH cam profile 192 on sector plate 152, or other shift profiles for virtually any transfer case application.

FIG. 14 graphically illustrates a comparison of the axial force ($F_A$) values for multi-ramped cam edge 192 of sector plate 154 and the conventional single-ramped cam edge shown in FIG. 5. Moreover, plot "A" depicts the force curve for sector plate 154 while plot "B" is indicative of the force curve associated with the conventional single cam edge "P" type sector plate shown in FIG. 6. In the preferred embodiment disclosed, for a given input torque (T), sector plate 154 generates significantly higher axial force ($F_A$) values on second contoured surface 196 (i.e. during the second and third synchronization phases where maximum force is required) which, in turn, produces a significantly increased cone torque capacity for synchronizer apparatus 86. First and third contoured surfaces 194 and 198, respectively, are likewise designed to generate sufficient axial force ($F_A$) values necessary to accomplish their corresponding phases of the synchronization process while permitting a smooth shift "feel" for the vehicle operator.

Finally, FIG. 15 illustrates the significant improvement in shift effort associated with sector plate 154 (Plot "C") under both severely cold and normal ambient front axle fluid temperature conditions compared to a conventional sector plate (Plot "D"). Not only is the shift constant substantially reduced over the entire temperature range, but sector plate 154 also permits 2WH-to-4WH shifting below a temperature (approx. 15° F.) which was heretobefore not possible with a conventional sector plate. It is to be understood, that the graphical illustrations shown in FIGS. 13 through 15 are merely exemplary in nature. However, these graphs illustrate the great latitude provided for developing an optimum force verse displacement curve for any given transfer case application.

Following the synchronized 2WH to 4WH shift, the vehicle operator can selectively shift between 4WH and 4WL via continued movement of shift lever 156 which acts to cause continued rotation of sector plate 154. Such continued rotation causes mode pin 142 to ride on third cam edge 193 of sector plate 154 while range pin 162 moves within slot 160 for axially moving range fork 176 and, in turn, range clutch 58 on shift rail 130. As best seen in FIG. 5, sector plate 154 is provided with a notch 200 which opens a contact of a switch member 202 when transfer case 12 is shifted into the neutral (N) drive mode from either the four-wheel high (4WH) or the four-wheel low (4WL) operating modes. When closed, switch 202 completes a circuit which energizes a light on the instrument panel indicating to the operator that the vehicle is in a four-wheel drive operating mode.

While a specific embodiment of the invention has been shown and described in detail to illustrate the application of the principles of the invention, it will be understood that the invention may be embodied in other forms without departing from such principles and the fair scope of the present invention.

What is claimed is:

1. A shift apparatus for shifting a transfer case between a two-wheel drive mode and a four-wheel drive mode, said shift apparatus comprising; a sector plate supported within said transfer case for rotation about an axis, a first pin member biased into engagement with a first surface of said sector plate, said first pin member adapted to move a first shift fork between first and second positions respectively corresponding to said two-wheel drive mode and said four-wheel drive mode of said transfer case in response to selective rotation of said sector plate, said first surface having a first cam edge provided for positioning said first . shift fork in said first position, a second cam edge provided for moving said first shift fork between said first position and said second position in response to rotation of said sector plate, and a third cam edge provided for retaining said first shift fork in said second position upon continued rotation of said sector plate about said axis, the improvement wherein said second cam edge defines a non-linear edge profile having a plurality of sequentially ramped surfaces which are each configured to cause a distinct axial force to be exerted on said first pin member during movement thereof between said first and second positions.

2. The shift apparatus of claim 1 wherein said sequentially ramped surfaces formed on said second cam edge include first, second and third ramped surfaces, said first ramped surface being located adjacent said first cam edge for moving said first pin member and said first shift fork a first preselected amount upon initial rotation of said sector plate, said second ramped surface being located adjacent said first ramped surface and adapted to move said first pin member and said first shift fork a second preselected amount in response to further rotation of said sector plate, and said third ramped surface being located intermediate said second ramped surface and said third cam edge for moving said first pin member and said first shift fork a third preselected amount in response to still further rotation of said sector plate.

3. The shift apparatus of claim 2 wherein said first shift fork is operatively coupled to a clutch sleeve of a synchronizer apparatus for causing corresponding movement of said clutch sleeve between said first position wherein said clutch sleeve is disengaged from a chain carrier of said transfer case for defining said two-wheel drive mode, and said second position wherein said clutch sleeve lockingly engages said chain carrier for locking said transfer case in said four-wheel drive mode.

4. The shift apparatus of claim 3 further comprising a second pin member biased into engagement with a second surface of said sector plate, said second pin member adapted to move a second shift fork relative to said first shift fork for shifting gear reduction means provided in said transfer case between a high-range operating position and a low-range operating position upon continued rotation of said sector plate when said first pin member is in engagement with said third cam edge.

5. The shift apparatus of claim 4 further comprising shift means coupled to said sector plate and operable for selectively rotating said sector plate under the control of a vehicle operator.

6. The shift apparatus of claim 5 wherein said first, second and third ramped surfaces of said second cam edge are each configured differently for causing a distinct axial force to be exerted on said first pin member upon a relatively constant input being applied to said sector plate via said shift means, and wherein upon said first pin member engaging said second ramped surface said synchronizer apparatus is energized, whereby said second ramped surface is configured to exert a greater axial force on said first pin member than said first and third ramped surfaces for generating increased synchronizer torque upon energization of said synchronizer apparatus.

7. The shift apparatus of claim 6 wherein each of said first, second and third ramped surfaces is a generally arcuate surface having a distinct arc length and an associated center which is offset from said axis.

8. The shift apparatus of claim 6 wherein each of said first, second and third ramped surface is a linearly ramped surface having different slopes and lengths.

9. The shift apparatus of claim 6 wherein said transfer case includes an input shaft adapted for connection to an engine of a motor vehicle, a first output shaft adapted for driving connection to rear ground-engaging wheels of said motor vehicle and a second output shaft adapted for driving connection to the front ground-engaging wheels of said motor vehicle, said gear reduction means being positioned between said input shaft and said first output shaft, said synchronizer apparatus having a hub member splined to said first output shaft in axially spaced relation to said chain carrier journalled on said first output shaft, said synchronizer apparatus having first conical surface means adapted for frictional engagement with second conical surface means formed on said chain carrier, said clutch sleeve encircling said hub and having internal spline teeth engaged for axial sliding movement with external spline teeth formed on said hub, and wherein said first fork member is adapted to shift said clutch sleeve between said first two-wheel drive mode position wherein torque from said input shaft is transmitted only to said first output shaft, and said second four-wheel drive mode position wherein torque is transmitted to both said first and second output shafts.

10. The shift apparatus of claim 9 further comprising a shift rail having said first pin member and said first shift fork supported for axial movement thereon upon selective rotation of said sector plate, and wherein said first ramped surface is configured to cause a sufficient axial force to be exerted on said first pin member for taking up running clearances in said synchronizer apparatus upon initial rotation of said sector plate, said second ramped surface adapted to cause energization of said synchronizer apparatus with an increased axial force being exerted on said mode pin, said increased axial force causing a corresponding increase in the synchronization torque generated by said synchronizer apparatus, and wherein said third ramped surface is adapted to develop a sufficient axial force at said first pin member for locking said clutch sleeve to said chain carrier.

11. A shift apparatus of the type used in a transfer case for moving a shift fork assembly between a two-wheel drive mode position and a four-wheel drive mode position said shift apparatus comprising, a sector plate supported within said transfer case for rotation about an axis, a mode pin member biased into engagement with a first surface of said sector plate, said mode pin member adapted to move said shift fork assembly between said two-wheel drive mode position and said four-wheel drive mode position in response to selective rotation of said sector plate, said sector plate first surface having a first cam edge provided for positioning said shift fork assembly in said two-wheel drive mode position, a second cam edge for moving said shift fork assembly between said two-wheel drive mode position and said four-wheel drive mode position upon selective rotation of said sector plate, and a third cam edge provided for positioning and retaining said shift fork assembly in said four-wheel drive mode position upon continued rotation of said sector plate about said axis, the improvement wherein said second cam edge has a non-linear edge profile including first, second and third ramp surface means consecutively formed thereon, said first ramp surface means being located adjacent said first cam edge for moving said mode pin member and said shift fork assembly a first preselected amount upon initial rotation of said sector plate, said second ramp surface means being located adjacent said first ramp surface means and adapted to move said mode pin member and said shift fork assembly a second preselected amount in response to further rotation of said sector plate, and said third ramp surface means being located intermediate said second ramp surface means and said third cam edge for moving said mode pin member and said shift fork assembly a third preselected amount in response to still further rotation of said sector plate for positioning said shift fork assembly in said four-wheel drive mode position.

12. The shift apparatus of claim 11 wherein said shift fork assembly is operatively coupled to a clutch sleeve of a synchronizer apparatus for moving said clutch sleeve between said two-wheel drive operating position and said four-wheel drive operating position in response to rotation of said sector plate, said first preselected amount of movement of said shift fork assembly acting to take up running clearances in said synchronizer apparatus, said second preselected amount of movement of said shift fork assembly causing energization of said synchronizer apparatus, and said third preselected amount of movement provided for locking said clutch sleeve to a chain carrier so as to completely shift said transfer case into its four-wheel drive operating mode.

13. The shift apparatus of claim 12 further comprising shift means coupled to said sector plate and operable for selectively rotating said sector plate under the control of a vehicle operator.

14. The shift apparatus of claim 13 wherein said non-linear edge profile of said second cam edge is operable to cause a variable range of axial forces to be exerted on said mode pin member in response to a relatively constant input torque being applied to rotate said sector plate via said shift means, and wherein said second ramp surface means is configured so as to exert a greater axial force on said mode pin member than said first and third ramp surface means for generating a corresponding increase in the synchronizer torque developed upon energization of said synchronizer apparatus.

15. In a transfer case apparatus adapted for a motor vehicle having front and rear ground-engaging wheels, said transfer case including an input shaft adapted for connection to an engine of said motor vehicle, a first output shaft adapted for driving connection to said rear ground-engaging wheels and a second output shaft adapted for driving connection to said front ground-engaging wheels, gear reduction means drivingly coupling said input shaft to said first output shaft for providing a first high-range direct-drive position, a second low-range position and a third neutral position disengaging said input shaft from said first output shaft, means for selectively shifting said gear reduction means between said first, second and third positions, a synchronizer clutch assembly comprising a hub member splined to said first output shaft in axially spaced relation from a chain carrier journally supported on said first output shaft, said clutch assembly having a blocker ring with first conical surface means disposed for controlled frictional engagement with second conical surface means formed on said chain carrier, said hub member including a cylindrical hub portion encircling said blocker ring and having external spline teeth formed thereon, a clutch sleeve encircling said hub portion and provided with internal spline teeth meshingly engaging external spline teeth on said hub portion, resilient loading means for moving said blocker ring toward said chain carrier to effect said frictional engagement between said first and second conical surface means, said transfer case including a shift fork assembly having a first shift fork mounted on a shift rail, said first shift fork adapted to co-act with said clutch sleeve for causing slidable reciprocal travel of said clutch sleeve relative to said first output shaft between a two-wheel drive mode position wherein torque from said input shaft is only transmitted to said first output shaft, and a four-wheel drive mode position wherein torque is transmitted to both of said first and second output shafts, said shift fork assembly further including a sector plate supported for rotation about an axis, and a mode pin coupled to said first shift fork, said mode pin biased into engagement with a first surface of said sector plate such that said mode pin causes axial movement of said first shift fork and said clutch sleeve between said two-wheel drive mode position and said four-wheel drive mode position in response to selective rotation of said sector plate, said first surface having a first cam edge for positioning said clutch sleeve in said two-wheel drive mode position, a second cam edge for axially moving said clutch sleeve between said two-wheel drive mode position and said four-wheel drive mode position, and a third cam edge provided for positioning and retaining said clutch sleeve in said four-wheel drive mode position, the improvement wherein said second cam edge includes a plurality of sequentially ramped surfaces each of which being adapted to cause a distinct axial force to be exerted on said mode pin for permitting axial movement thereof, said sequentially ramped surfaces being constructed and arranged to generate maximized axial forces on said mode pin for producing increased synchronizer torque via increased frictional engagement between said first and second conical surface means during energization of said synchronizer clutch assembly.

16. The transfer case of claim 15 wherein said sequentially ramped surfaces formed on said second cam edge define a non-linear surface profile including first, second and third ramp surfaces, said first ramp surface being located adjacent said first cam edge for moving said clutch sleeve a first preselected amount upon initial rotation of said sector plate, said second ramp surface being located adjacent said first ramp surface and adapted to move said clutch sleeve a second preselected amount in response to further rotation of said sector plate, and said third ramp surface being located intermediate said second ramp surface and said third cam edge for moving said clutch sleeve a third preselected amount in response to still further rotation of said sector plate for locking said transfer case into said four-wheel drive mode.

17. The transfer case of claim 16 wherein said shift fork assembly is operatively coupled to said clutch sleeve of said synchronizer apparatus for moving said clutch sleeve between said two-wheel operating position and said four-wheel drive operating position in response to rotation of said sector plate, said first preselected amount of movement of said clutch sleeve acting to take up running clearances in said synchronizer apparatus, said second preselected amount of movement of said clutch sleeve causing energization of said synchronizer apparatus, and said third preselected amount of movement of said clutch sleeve provided for locking said clutch sleeve to said chain carrier so as to shift said transfer case into its four-wheel drive operating mode.

18. The transfer case of claim 17 wherein said non-linear surface profile formed on said second cam edge causes a variable range of axially directed forces to be exerted on said mode pin in response to a relatively constant input torque being exerted for rotating said sector plate, said second ramp surface being configured to cause a greater axial force to be exerted on said mode pin than said first and third ramp surfaces for generating a corresponding increase in the synchronizer torque developed upon energization of said synchronizer apparatus.

19. The transfer case of claim 18 further comprising a range pin biased into engagement with a second surface of said sector plate, said range pin operable to move a second shift fork relative to said first shift fork for shifting said gear reduction means between said various range positions upon continued rotation of said sector plate when said mode pin is engaging said third cam edge.

20. In a gear synchronizer assembly comprising a gear member rotatable on a shaft, said gear member including external spline teeth and having an external conical surface portion formed thereon, a blocker ring mounted on said gear member external conical surface having an internal conical surface for frictional engagement therewith, a hub member fixed mounted on said shaft for rotation therewith and having a cylindrical hub portion encircling said blocker ring, said hub member formed with external spline teeth, a clutch sleeve encircling said hub portion and having internal spline teeth in continual engagement with said hub portion external spline teeth, said clutch sleeve being axially movable by a shift apparatus between a first position disengaged from said gear member and a second positioned wherein said clutch sleeve internal spline teeth lockingly engage said external spline teeth of said gear member, and resilient loading means for moving said blocker ring toward said gear member during the axial shifting operation of said clutch sleeve toward said gear member to effect frictional engagement of said blocker ring internal conical surface with said gear member external conical surface, said shift apparatus comprising a shift rail disposed in spaced parallel relation with said shaft having forward and rearward ends, means for supporting said shift rail adjacent its forward and rearward ends for permitting axial reciprocal movement of said shift rail during selected modes of operation of said synchronizer assembly, said shift apparatus further comprising a shift fork assembly mounted on said shift rail, said shift fork assembly having a shift fork member adapted to co-act with said clutch sleeve for slidable reciprocal travel along said shaft, said shift fork assembly further including a sector plate supported for rotation about an axis, and a mode pin coupled to said shift fork, said mode pin biased into engagement with a first surface of said sector plate such that said mode pin causes axial movement of said shift fork and said clutch sleeve in response to selective rotation of said sector plate, said sector plate first surface having a first cam edge for positioning said clutch sleeve in said first position, a second cam edge for axially moving said clutch sleeve between said first position and said second position upon rotation of said sector plate, and a third cam edge provided for positioning and retaining said clutch sleeve in said second position upon continued rotation of said sector plate about said axis, said second cam edge including a non-linear surface profile having a plurality of sequentially ramped surfaces which are adapted to each cause a distinct axial force to be exerted on said mode pin member during movement between said first and second positions.

21. The gear synchronizer assembly of claim 20 wherein said plurality of sequentially ramped surfaces formed on said second cam edge include first, second and third ramp surfaces, said first ramp surface being located adjacent said first cam edge for moving said clutch sleeve a first preselected amount upon initial rotation of said sector plate, said second ramp surface being located adjacent said first ramp surface and adapted to move said clutch sleeve a second preselected amount in response to further rotation of said sector plate, and said third ramp surface being located intermediate said second ramp surface and said third cam edge for moving said clutch sleeve a third preselected amount in response to still further rotation of said sector plate.

22. The gear synchronizer assembly of claim 21 wherein said shift fork assembly is operatively coupled to said clutch sleeve for moving said clutch sleeve between said first position and said second position in response to rotation of said sector plate, said first preselected amount of movement of said clutch sleeve acting to take up running clearances in said gear synchronizer assembly, said second preselected amount of movement of said clutch sleeve causing energization of said gear synchronizer assembly and said third preselected amount of movement of said clutch sleeve provided for locking said clutch sleeve to said chain carrier in said second position.

23. The gear synchronizer assembly of claim 22 wherein said clutch sleeve is moved from said first neutral position to a position wherein said blocker ring and gear member conical surfaces are frictionally loaded by said resilient loading means for developing an initial cone torque therebetween when said sector plate is rotated to a position where said mode pin is engaging said first ramp surface whereby said blocker ring is rotated in one direction to an indexed position, thereafter said clutch sleeve internal splines positioned with its chamfered edges engaging chamfered edges of an opposed blocker ring external spline tooth for thereby developing increased cone torque when said sector plate is further rotated to a position wherein said mode pin is engaging said second ramp surface, and wherein upon said sector plate being still further rotated to a position wherein said mode pin is engaging said third ramp surface the index torque developed in said indexed position exceeds the cone torque developed by said conical surfaces such that said blocker ring is rotated in the opposite direction allowing said sleeve internal splines to pass into locked engagement with said gear member external splines.

* * * * *